(12) United States Patent
Bolton

(10) Patent No.: US 6,202,330 B1
(45) Date of Patent: Mar. 20, 2001

(54) EXCAVATION ASSEMBLY, APPARATUS AND METHOD OF OPERATING THE SAME

(75) Inventor: D. Edward Bolton, Milwaukee, WI (US)

(73) Assignee: Bolton Corporation, West Allis, WI (US)

( * ) Notice: Subject to any disclaimer, the term of this patent is extended or adjusted under 35 U.S.C. 154(b) by 0 days.

(21) Appl. No.: 09/290,494

(22) Filed: Apr. 12, 1999

Related U.S. Application Data

(60) Provisional application No. 60/082,765, filed on Apr. 23, 1998, and provisional application No. 60/101,808, filed on Sep. 25, 1998.

(51) Int. Cl.$^7$ ...................................................... E02F 3/76
(52) U.S. Cl. ................................ 37/403; 37/905; 37/195; 175/67
(58) Field of Search ............................. 37/315, 316, 317, 37/189, 347, 344, 905, 466, 330, 331, 335, 320, 403, 195; 175/67, 213, 215, 424; 15/300.1, 405; 171/16

(56) References Cited

U.S. PATENT DOCUMENTS

| | | |
|---|---|---|
| 207,064 | 8/1878 | Pontez . |
| 1,719,668 | 7/1929 | McEachern . |
| 2,125,740 | 8/1938 | Schacht ................................... 37/62 |
| 2,678,203 | 5/1954 | Huff ........................................ 262/2 |
| 3,965,687 | 6/1976 | Shaw ....................................... 61/46 |
| 4,352,251 | 10/1982 | Sloan ...................................... 37/58 |
| 4,479,741 | 10/1984 | Berti et al. .......................... 405/163 |
| 4,825,963 | 5/1989 | Ruhle .................................... 175/60 |
| 4,871,037 | 10/1989 | Warren et al. ........................ 175/67 |
| 4,936,031 | 6/1990 | Briggs et al. ........................ 37/80 R |
| 4,991,321 | 2/1991 | Artzberger .............................. 37/62 |
| 5,016,717 | 5/1991 | Simons et al. ........................ 175/66 |
| 5,120,165 | 6/1992 | Walko, Jr. .............................. 406/40 |
| 5,140,759 | 8/1992 | Artzberger ........................... 37/80 R |
| 5,212,891 | 5/1993 | Schuermann et al. ................... 37/62 |
| 5,295,317 | 3/1994 | Perrott ................................... 37/348 |
| 5,299,370 | * 4/1994 | Gyori et al. ....................... 37/905 X |
| 5,361,855 | 11/1994 | Schuermann et al. ................ 175/67 |
| 5,408,766 | * 4/1995 | Pobihushchy ...................... 37/905 X |
| 5,425,188 | 6/1995 | Rinker .................................. 37/317 |

(List continued on next page.)

OTHER PUBLICATIONS

Equipment Today, Technology Update, "Soft Trencher" Concept Engineering Group, Inc., Oct., 1994.

Battelle Press Release—"Softe Trencher" Designed to Provide Safer, More economical Excavation, Aug. 19, 1997, http://www.battelle.org./pr/7trench.html.

Primary Examiner—Victor Batson
(74) Attorney, Agent, or Firm—Michael Best & Friedrich LLP

(57) ABSTRACT

An excavation assembly, an apparatus and method of operating the same. At least a portion of the assembly is attachable to a vehicle including a frame and an arm supported on the frame, the arm having one end supported on the frame and an other end movable relative to the frame. The assembly includes an excavation head supportable on the other end of the arm for movement relative to the frame. The head may be substitutable with a hard-tooth excavation component, such as a backhoe bucket. The head includes a support member having a support surface positionable adjacent a surface to be excavated, the support member being attachable to the other end of the arm, a nozzle, and a vacuum. The assembly further comprises a source of pressurized fluid connected to the nozzle so that fluid is provided through the nozzle to cut the surface to be excavated and a source of vacuum pressure connected to the vacuum so that material cut from the surface is removed from the surface. The source of pressurized fluid may be selectively connectable to a fluid-powered equipment component to power that component. The apparatus may include a liftable collection member to be emptied into a separate material removal vehicle.

24 Claims, 7 Drawing Sheets

U.S. PATENT DOCUMENTS

| | | | |
|---|---|---|---|
| 5,487,228 | 1/1996 | Marazzo et al. | 37/317 |
| 5,487,229 | 1/1996 | Nathenson et al. | 37/347 |
| 5,535,836 | 7/1996 | Cagianut et al. | 175/213 |
| 5,598,674 | 2/1997 | Marazzo et al. | 37/317 |
| 5,860,232 | 1/1999 | Nathenson et al. | 37/466 |
| 5,966,847 * | 10/1999 | Nathenson et al. | 37/347 |

* cited by examiner

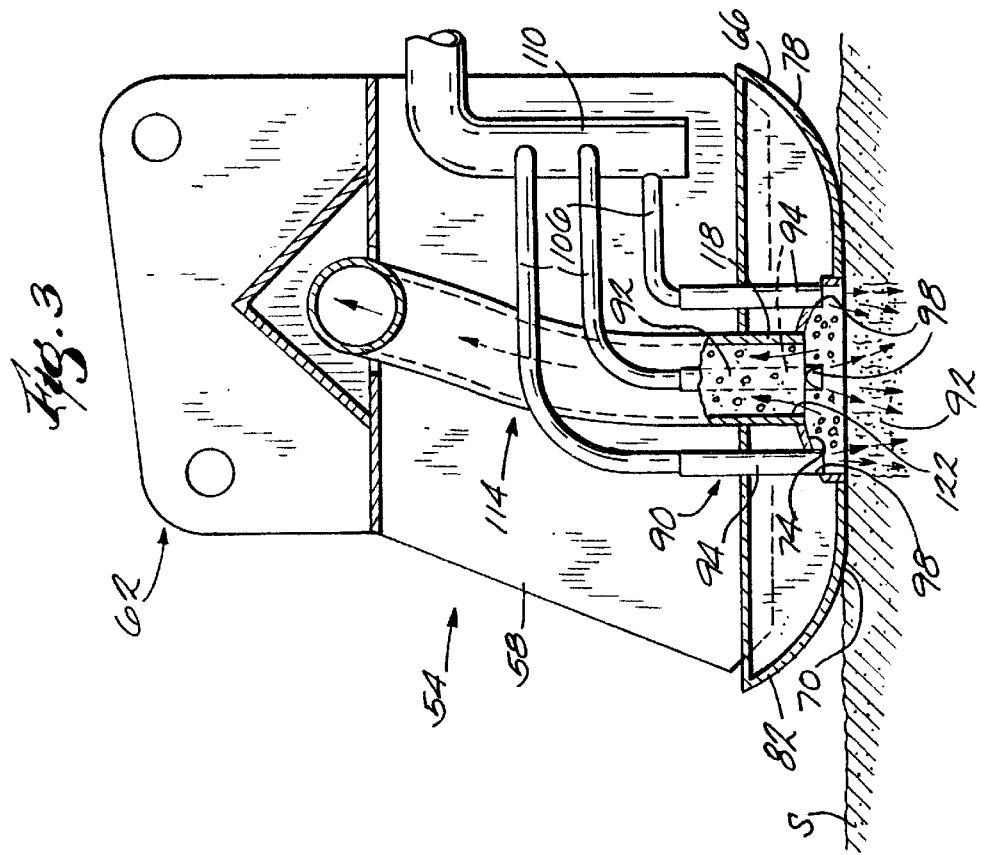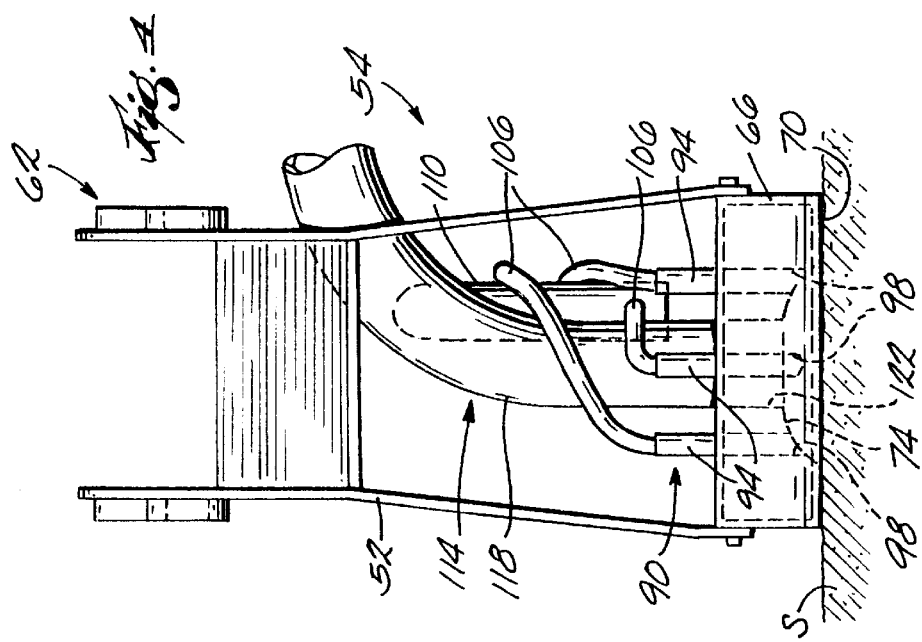

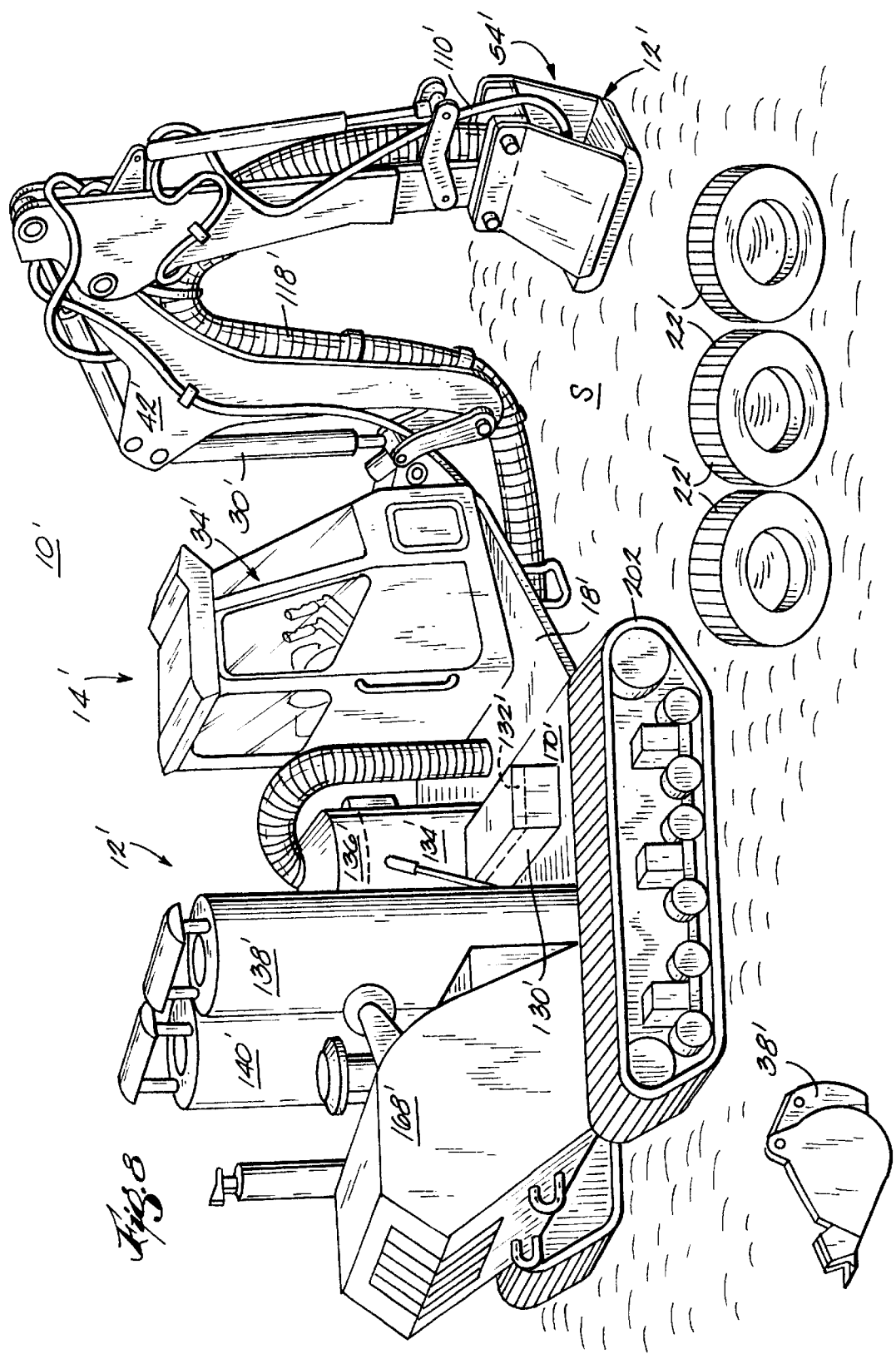

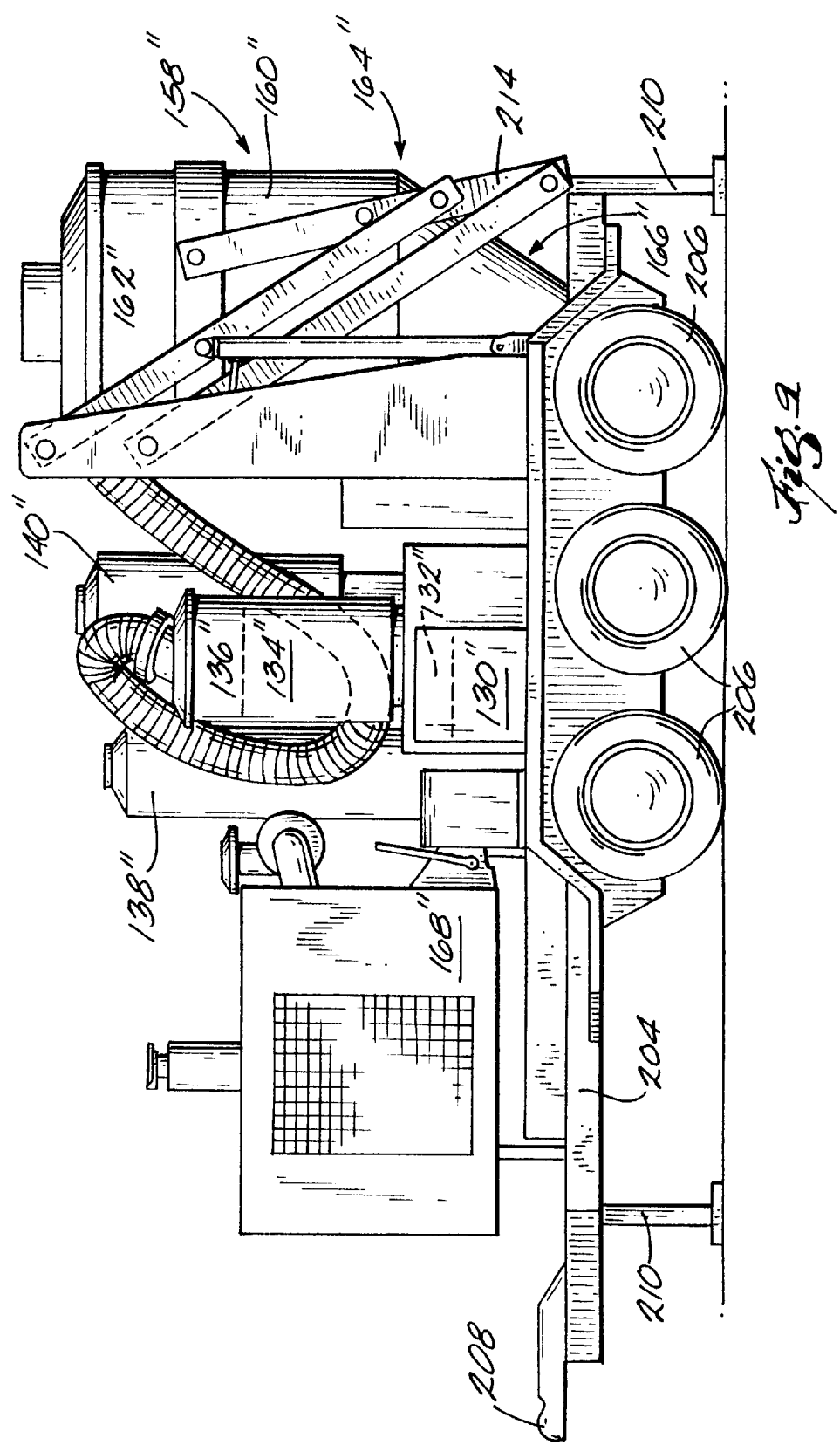

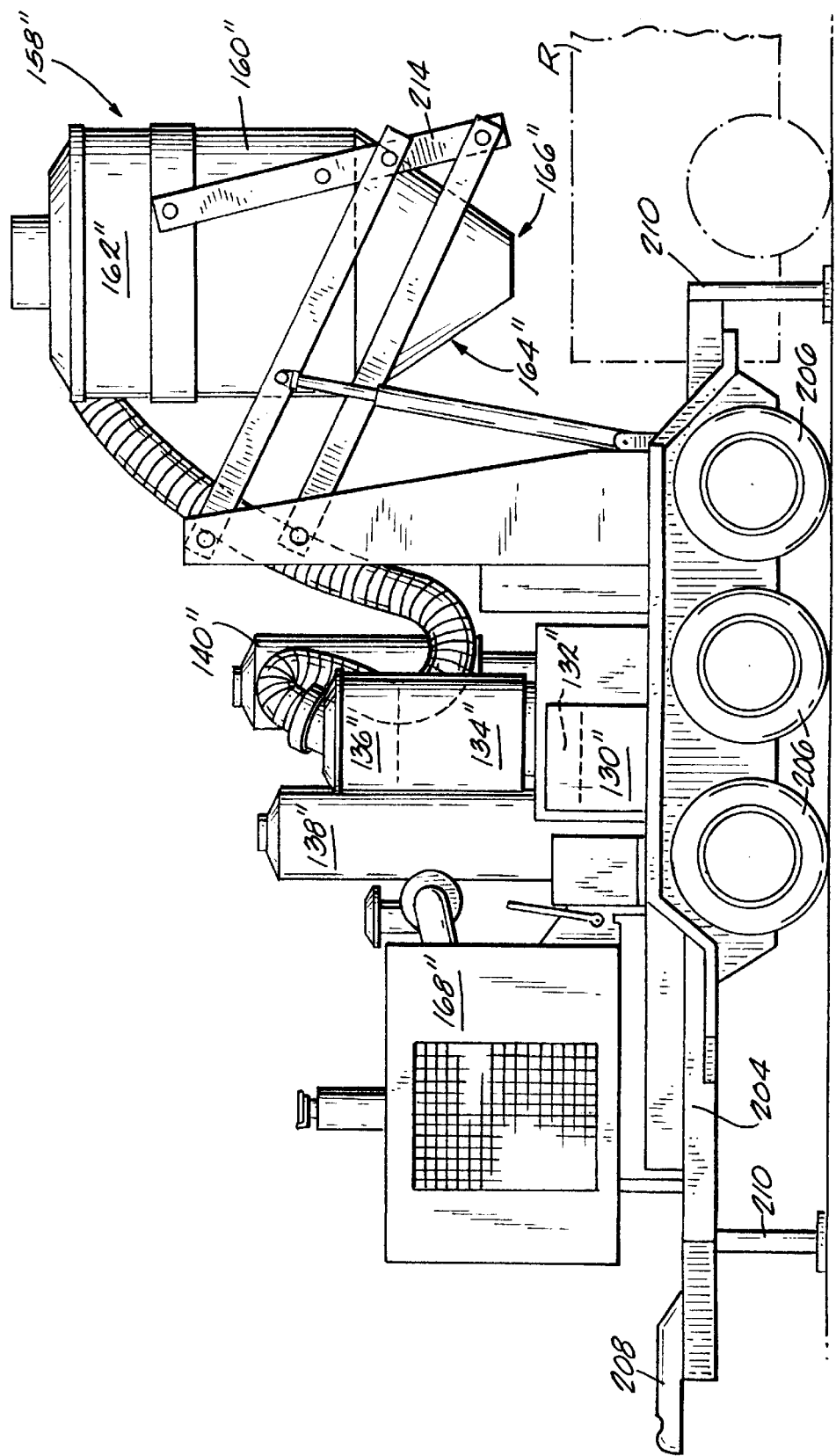

EXCAVATION ASSEMBLY, APPARATUS AND METHOD OF OPERATING THE SAME

This application claims the benefit of prior filed co-pending provisional patent applications, Ser. No. 60/082,765, filed on Apr. 23, 1998; and Ser. No. 60/101,808, filed on Sep. 25, 1998.

BACKGROUND OF THE INVENTION

The invention relates to excavation, and, more particularly, to excavation assemblies, apparatus and methods.

Generally, excavation requires the cutting and removal of soil or other solid excavated material from an excavated surface. One type of excavation apparatus is a hard-tooth apparatus, such as a backhoe, a trenching machine, a jack hammer or a manual pick or shovel. These apparatus include a cutting tool with a cutting edge that is forced into the ground to cut the soil from the surface. The cutting tool may also be used to remove the soil from the surface. Some of these hard-tooth apparatus, for example, some jack hammers, and other equipment required at the excavation site are pneumatically operated and require a compressor as a power unit.

Another type of excavation apparatus is a non-intrusive excavation apparatus or soft excavator. A non-intrusive excavation apparatus uses jets of fluid, such as air, to loosen the soil. A vacuum may be used to remove the soil from the excavated surface. The non-intrusive excavation apparatus does not include a hard cutting edge that is forced into the ground to cut the soil.

U.S. Pat. No. 5,487,229 discloses a soft excavator including an excavation head mounted on one end of telescoping hollow boom. The excavation head has a nozzle for directing jets of high speed air at an excavation face to loosen soil. A vacuum transport pipe extends from the excavation head through the hollow of the boom. The apparatus includes primary and secondary separators for disentraining loosened soil from air flowing through the separators. The apparatus also includes a conveyor located under the primary and secondary separators to receive soil from the separators and to remove the soil from the apparatus. The apparatus is supported on a chassis above the ground by wheels to provide mobility for the apparatus.

U.S. Pat. No. 5,212,891 discloses another type of soft excavator, namely, a hand-held wand. The wand includes a nozzle to cut soil and a passage to remove the excavated soil.

U.S. Pat. No. 5,120,165 discloses an excavation system with pneumatic conveyance and separation of a excavated material. The excavation system fragments excavated material. The material is entrained and pneumatically conveyed to a remote site for separation of the material from the gas. One or more separators communicates serially with the flow path and separates and collects the excavated material. At least one separator includes a high-efficiency cyclone chamber. In one embodiment, the separator is mounted on a truck, and the truck can be separated from the excavation system and driven to an excavant disposal/storage site where the truck can be emptied.

U.S. Pat. No. 5,016,717 discloses a vacuum excavator. The excavation apparatus includes a suction system and a liquid jet system mounted on a vehicle. The suction tank is emptied by opening the rear hatch and raising the front end of the tank.

SUMMARY OF THE INVENTION

One problem with conventional hard-tooth excavation apparatus is that, as the hard cutting edge cuts the surface, the apparatus can damage buried utilities, such as electric power cables, natural gas piping, communication cables, and water pipes. While damaging the utilities, the apparatus can also be damaged, and the operator can be injured. Also, the damage results in an interruption of utility service in the area.

Another problem with some conventional hard-tooth excavation apparatus is that the cutting tool, such as the bucket of a backhoe, also removes the soil from the excavation surface. As a result, the bucket must be constantly emptied and repositioned, reducing the efficiency of the excavation operation and also requiring increased operator skill. In addition, the constant movement of the cutting tool and the supporting arm increases the wear and tear on the excavation apparatus.

One problem with conventional hard-tooth excavation apparatus and soft excavators is that, typically, two separate pieces of equipment, i.e., a hard-tooth excavation apparatus and a soft excavator, are required if both hard-tooth excavation and non-intrusive excavation is desired. Further, because the typical soft excavator does not have a high rate of excavation, an additional hard-tooth excavator is required to complete the excavation operation in a timely manner. The costs of excavation operations and of storage and transportation of the equipment are thus greatly increased.

Another problem with conventional hard-tooth excavation apparatus and soft excavators, such as the soft excavator disclosed in U.S. Pat. No. 5,487,229, is that, typically, these pieces of equipment include vastly different components and are not operated in the same manner. As a result, operators require separate training and experience on each piece of equipment in order to conduct efficient excavation operations.

Yet another problem with conventional hard-tooth excavation apparatus and soft excavators is that a compressor is needed at the work site to operate the additional pneumatic tools, such as pneumatic jack hammers and the like. Even with conventional soft excavators, an additional compressor is required because the compressor included in the soft excavator does not have sufficient capacity to power the additional pneumatic tools.

A further problem with some conventional soft excavators is that, because a separate compressor is required, these excavators are not used in conjunction with a non-intrusive excavation wand. As a result, these excavators do not completely remove material from areas of complex utility junctions or clusters. Typically, an operator must manually clear material from these areas.

Another problem with some conventional soft excavators is that the fluid jet cutting device is separate from the soil removal device. To excavate with such a soft excavator, the cutting device loosens some soil and then must be removed and replaced with the removal device, making this process inefficient.

Yet another problem with some conventional soft excavators is that a component of the excavation apparatus must be disconnected from the apparatus and moved to a different location for removal of excavated soil. In some cases, the excavation apparatus cannot be operated until the component is returned and reconnected to the system.

A further problem with some conventional soft excavators is that the components of the excavator, such as the compressor, the blower and the separator, are separately mounted and must therefore be transported separately.

Another problem with the soft excavator disclosed in U.S. Pat. No. 5,487,229 is that the telescoping boom and vacuum transport pipe are difficult to seal. This results in a loss of vacuum pressure and inefficient soil removal.

Yet another problem with the soft excavator disclosed in U.S. Pat. No. 5,487,229 is that additional seal or skirt elements are required around the excavation head to provide a seal between the excavation head and the excavated surface.

A further problem with the soft excavator disclosed in U.S. Pat. No. 5,487,229 is that the conveyor removes the soil from the apparatus and deposits the soil on the ground adjacent to the soft excavator.

The present invention provides an excavation assembly, apparatus and methods of operating the same that alleviate the problems of the conventional hard-tooth excavation apparatus and of the conventional soft excavators. Generally, the assembly includes an excavation head having a nozzle and a vacuum, a source of pressurized fluid connected to the nozzle so that fluid is provided through the nozzle to cut the surface to be excavated, and a source of vacuum pressure connected to the vacuum to remove soil from the excavated surface.

In one embodiment, the non-intrusive excavation assembly is attachable to the arm of a conventional hard-tooth excavation apparatus, such as a backhoe, and is substitutable for the hard-tooth cutting tool or bucket. In another embodiment, the assembly is an integral component of a non-intrusive excavation apparatus.

Also, the present invention provides a source of fluid pressure that is selectively connectable to the nozzle and to a fluid-powered equipment component required at the excavation site, such as a pneumatic jack hammer. When the source of pressurized fluid is connected to the nozzle, fluid is provided through the nozzle to cut the surface. When the source of fluid pressure is connected to the fluid-powered equipment, the source of pressurized fluid powers the fluid-powered equipment component. In one construction, the fluid-powered equipment component is a wand member including a wand nozzle and a wand vacuum, and the wand member is operable to provide non-intrusive excavation.

In addition, the present invention provides a collection member for collecting disentrained material. The collection member is movable from a collecting position, in which the material is collected, to an emptying position, in which the material is emptied from the collection member into a separate material removal vehicle. Preferably, the collection member is lifted from the collecting position to the emptying position, for example, to clear the sidewall of the bed of a dump truck. The collection member and other components are preferably supportable on a support member supported by the frame.

Further, the present invention provides a method of operating an excavation apparatus, the method generally including providing hard-tooth excavation with a hard-tooth excavation component, substituting an excavation head for the hard-tooth excavation component, and providing non-intrusive excavation with the excavation head.

Also, the present invention provides a method of operating an excavation assembly, the method generally including powering a fluid-powered equipment component with a source of pressurized fluid and supplying fluid from the source of pressurized fluid through the nozzle of the excavation head to provide non-intrusive excavation. In one construction, the fluid-powered equipment component is a wand member, and the method further includes operating the wand member to provide non-intrusive excavation.

One advantage of the present invention is that the assembly provides non-intrusive excavation, reducing the likelihood of damaging utilities, increasing equipment and operator safety and reducing utility interruptions due to excavation.

Another advantage of the present invention is that the soil cutting component, i.e., the nozzle, and the soil removal component, i.e., the vacuum, are supported on the excavation head. During non-intrusive excavation, the soil is cut and removed without requiring removal, emptying and subsequent repositioning of the excavation head. The soil removal component (the nozzle) and the soil removal component (the vacuum) operate simultaneously. This increases the efficiency of the excavation operation and reduces the wear and tear on the supporting structure.

Yet another advantage of the present invention is that, in one embodiment, the non-intrusive excavation assembly is attachable to a conventional hard-tooth excavation apparatus, such as a backhoe. This interchangeability increases the flexibility of excavation operations and reduces the costs associated with transportation and storage of excavation equipment.

A further advantage of the present invention is that, because the excavation head is substitutable for and operates like the rear bucket of a backhoe, very little additional operator training is required. An operator can efficiently use a backhoe equipped with either a hard-tooth bucket or the excavation head.

Another advantage of the present invention is that the compressor has sufficient capacity and is selectively operable to power fluid-powered hard-tooth excavation components, such as jack hammers and non-intrusive excavation wands, and to provide fluid through the nozzle member of the non-intrusive excavation head to cut the surface to be excavated. Therefore, additional compressors are not generally required at the work site.

Yet another advantage of the present invention is that the excavation head is used in conjunction with the wand member to provide improved soil removal in areas of complex utility junctions or clusters. An operator is not required to manually clear these areas of soil.

A further advantage of the present invention is that the nozzle and the vacuum of the excavation head are mounted and operated as a unit. Similarly, the nozzle and the vacuum of the wand are mounted and operated as a unit. As a result, after cutting soil, the nozzle does not have to be replaced by the vacuum to remove the soil, increasing the efficiency of operations.

Another advantage of the present invention is that the collection member is emptiable into a separate material removal vehicle. Therefore, the collection member does not have to be disconnected from the apparatus and removed from the excavation site to remove the material from the excavation site. This increases the efficiency of the excavation operations.

Yet another advantage of the present invention is that the compressor, the blower, the separator and the collection member are supported on a support member. These components are movable as a single unit on the support member to and from the excavation site and around the excavation site.

A further advantage of the present invention is that the material removal component, i.e., the vacuum and vacuum member, is more easily sealed and is not subject to frequent loss of vacuum pressure due to movement of the support arm and excavation head.

Another advantage of the present invention is that additional seals or skirts are not required between the support surface of the excavation head and the excavated surface. Also, because of the shape of the excavation head support member, the apparatus provides true non-intrusive excavation. Specifically, only the fluid jets contact the excavated surface. The operator can view the excavated surface before continuing to excavate.

Other features and advantages of the invention will become apparent to those skilled in the art upon review of the following detailed description, claims and drawings.

DESCRIPTION OF THE DRAWINGS

FIG. 3 is a side cross-sectional view of the excavation head shown in FIG. 2.

FIG. 7 is a perspective view of wand member shown in FIG. 1.

FIG. 8 is a perspective view of an alternative embodiment of the apparatus shown in FIG. 1.

FIG. 9 is a side view of an alternative construction of a portion of the apparatus shown in FIGS. 1 and 8.

FIG. 10 is a side view similar to that shown in FIG. 9 and illustrating the collection member in the emptying position.

Figure 1:
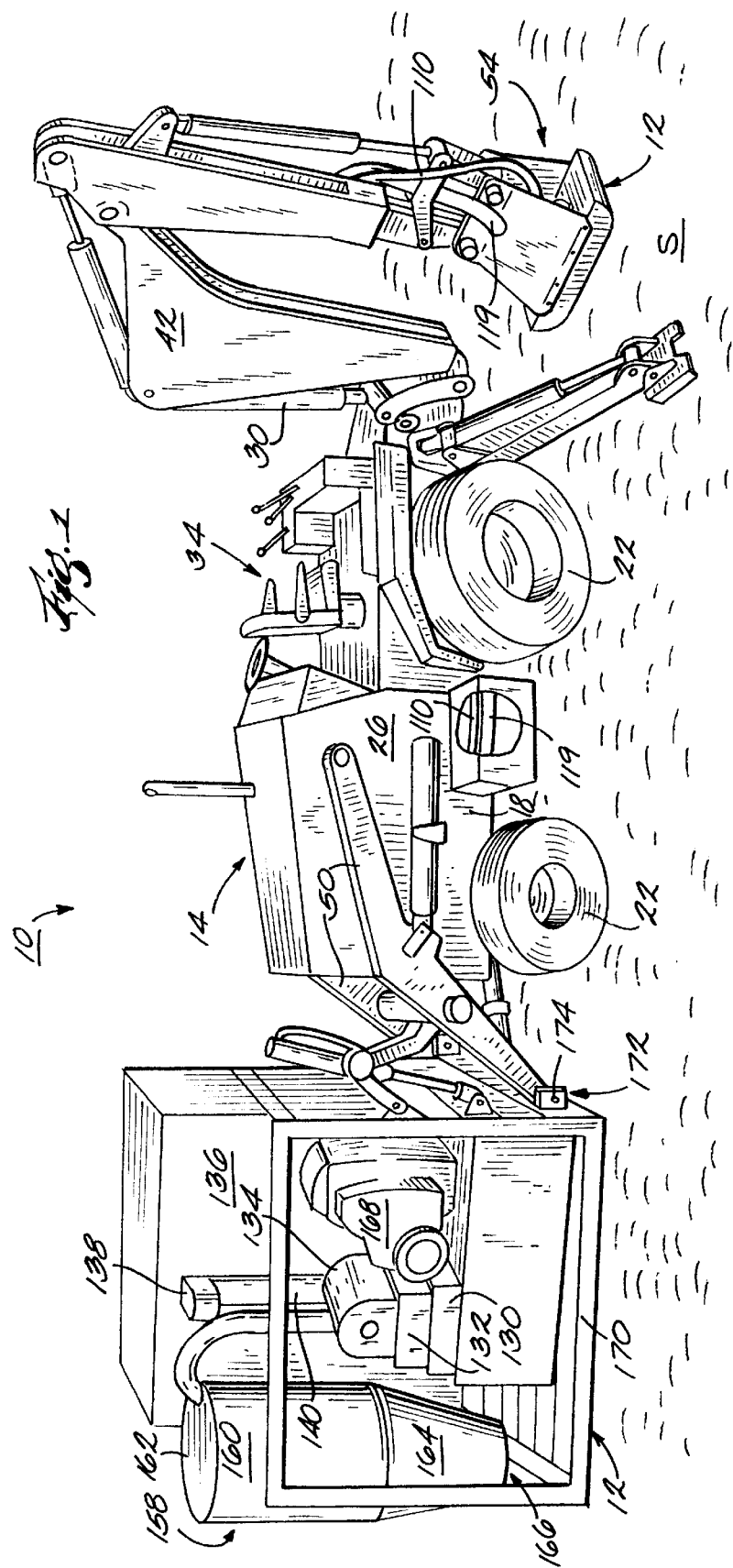
FIG. 1 is a perspective view of an apparatus including a non-intrusive excavation assembly embodying the invention.

Before one embodiment of the invention is explained in detail, it is to be understood that the invention is not limited in its application to the details of the construction and the arrangements of the components set forth in the following description or illustrated in the drawings. The invention is capable of other embodiments and of being practiced or being carried out in various ways. Also, it is understood that the phraseology and terminology used herein is for the purpose of description and should not be regarded as limiting.

DESCRIPTION OF THE PREFERRED EMBODIMENT

An apparatus 10 including a non-intrusive excavation assembly 12 and embodying the invention is illustrated in FIG. 1. The apparatus 10 includes a vehicle 14 having a frame 18 supported by wheels 22 or other means, such as tracks, for movement over ground. In the illustrated construction, the vehicle 14 is self-propelled and includes an engine 26 connected by a transmission (not shown) to the wheels 22. In other constructions (not shown), the vehicle 14 is not self-propelled but is towed by a prime mover vehicle (not shown). The vehicle 14 also includes a hydraulic system 30 (partially shown) connected to the engine 26 and an operator's station 34 for the apparatus 10. In other constructions (not shown), the apparatus 10 may include a remote operator's station.

In the embodiment illustrated in FIG. 1, the vehicle 14 is a hard-tooth excavation apparatus, such as a backhoe. The vehicle 14 includes a hydraulically-operated hard-tooth cutting component, such as a rear bucket 38, removably supportable (shown in the removed condition) on a support member or arm 42. The arm 42 is supported on the frame 18 so that the bucket 38 (when supported on the arm 42) is movable relative to the frame 18 to provide hard-tooth excavation of the surface S. In other constructions (not shown), the hard-tooth cutting component may be any suitable component, such as, for example, a drill unit or a saw unit.

In the embodiment illustrated in FIG. 1, the vehicle 14 also includes a front bucket 46 removably supportable on a pair of support arms 50. The support arms 50 are supported on the frame 18 so that the bucket 46 (when supported on the support arms 50) is movable relative to the frame 18 to also provide hard-tooth excavation of the surface S.

The non-intrusive excavation assembly 12 is operable to excavate a surface S and is removably supported (shown in the supported condition) on the vehicle 14. The non-intrusive excavation assembly 12 includes an excavation head 54 for providing non-intrusive excavation of the surface S.

Figure 2:
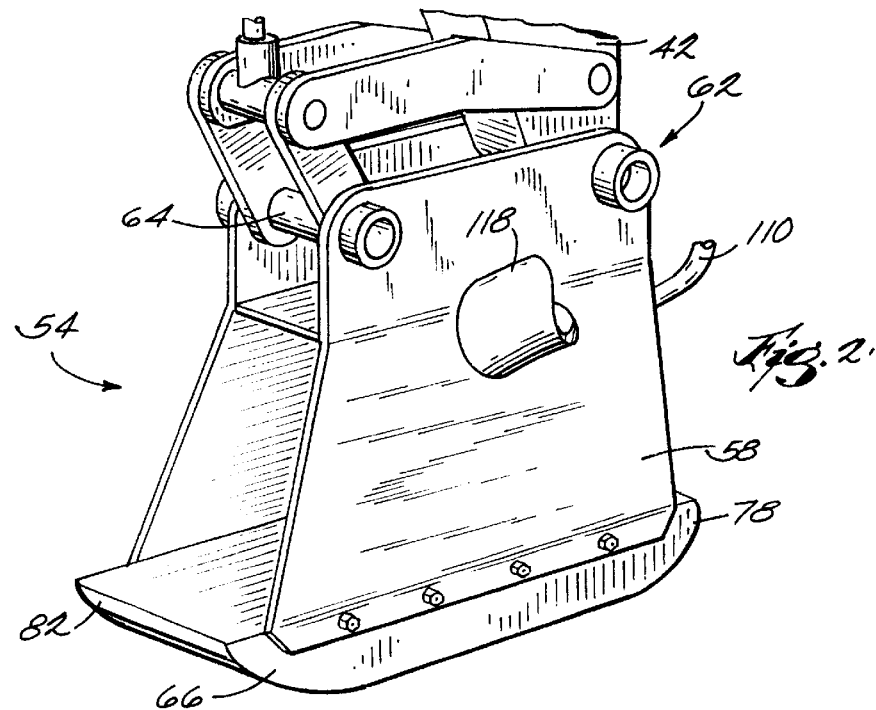
FIG. 2 is a perspective view of the excavation head of the assembly shown in FIG. 1.

The excavation head 54 includes (see FIGS. 2–4) a head support member 58 having a mounting portion 62. The mounting portion 62 is removably connectable to the movable end of the arm 42 by fasteners 64. The head support member 58 also includes (see FIGS. 2–5) a shoe portion 66 having a support surface 70 to support the excavation head 54 on the surface S. As shown in FIGS. 3–6, a concave portion 74 is formed generally in the center of the support surface 70. In the illustrated construction, the concave portion 74 has a generally circular periphery.

The shoe portion 66 also has (see FIGS. 2–3) upwardly curved leading and trailing end portions 78 and 82 to substantially prevent the excavation head 54 from becoming caught on any debris or exposed utilities. Outer support portions 86 surround the concave portion 74 and extend between the leading and trailing end portion 78 and 82.

Figure 5:
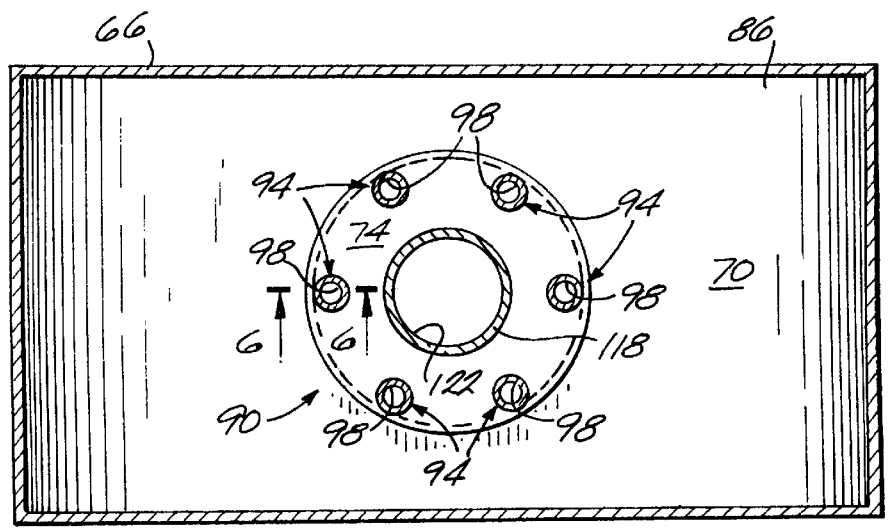
FIG. 5 is a bottom view of the excavation head shown in FIG. 2.
Figure 6:
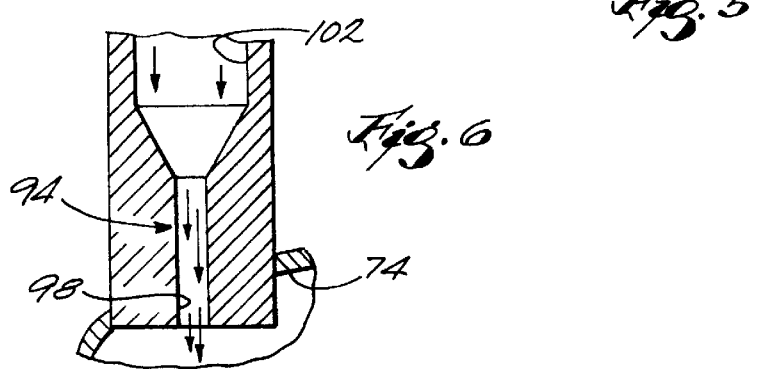
FIG. 6 is a cross-sectional view taken generally along line 6—6 in FIG. 5.
Figure 4:
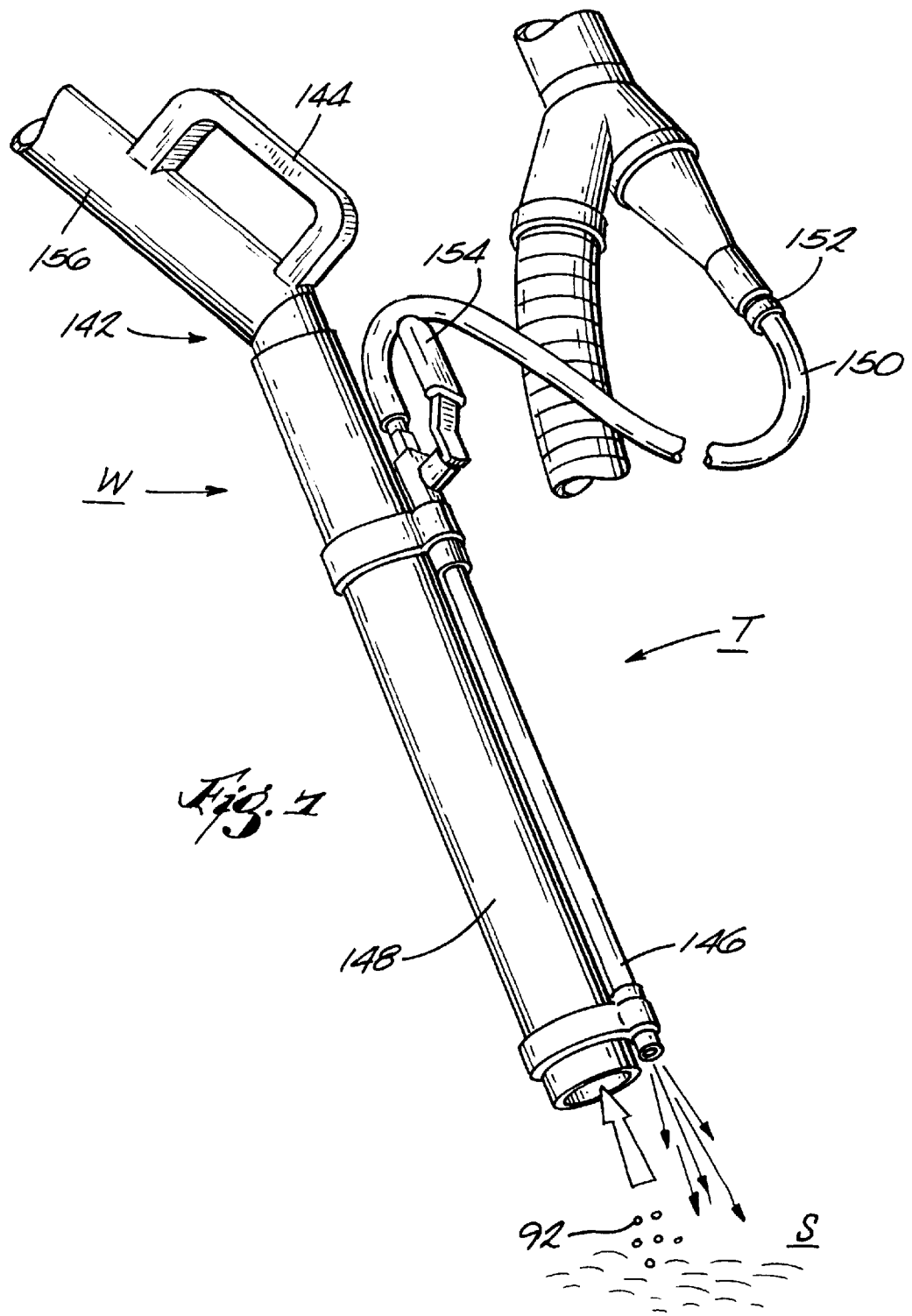
FIG. 4 is an end view of the excavation head shown in FIG. 2.

The excavation head 54 also includes (see FIGS. 3–6) a fluid jet assembly 90 to cut soil 92 from the surface S. In the illustrated construction, the fluid jet assembly 90 is an air knife assembly using pressurized or compressed air as the cutting means. As shown in FIG. 5, the fluid jet assembly 90 includes six nozzle members 94 spaced about the periphery of the concave portion 74 of the shoe portion 66. Each nozzle member 94 includes (see FIG. 6) a nozzle opening 98 and a plenum 102. As shown in FIGS. 3–4, a conduit 106 connects each plenum 102 to a fluid supply conduit 110.

In other constructions (not shown), the fluid jet assembly 90 may include fewer or more than six nozzle members 94. In addition, in other constructions (not shown), the nozzle members 94 may be oriented in a non-circular pattern, such as in a linear arrangement. The orientation and number of nozzle members 94 is designed based upon, for example, the surface S to be excavated and the capacity of the fluid supply (as discussed below).

The excavation head 54 also includes (see FIGS. 3–5) a vacuum assembly 114 to remove soil 92 from the surface S and to transport the soil 92 from the excavation zone. The vacuum assembly 114 includes a vacuum member or tube 118 having a vacuum opening 122. The vacuum opening 122 is located generally in the center of the concave portion 74 and generally in the center of the configuration of the nozzle members 94. In other constructions (not shown), the vacuum assembly 114 may include a plurality of vacuum members to provide a plurality of vacuum openings, and the orientation and position of these vacuum openings relative to the nozzle members 94 may be different.

The non-intrusive excavation assembly 12 also includes (see FIG. 1) a source of pressurized fluid connected to the fluid jet assembly 90. In the illustrated construction, the fluid is air and the source of pressurized fluid is an air compressor 130 connected to the supply conduit 110. The compressor 130 provides pressurized air through the supply conduit 110 to the nozzle members 94 to cut the soil 92 from the surface S (as shown in FIG. 3).

In the illustrated construction, the compressor 130 includes a silencer 132 and has a capacity in the range of 200 psi at 600 CFM. The capacity of the compressor 130 is based upon the excavation requirements, such as, for example, the type of soil 92 or other material to be excavated and the desired excavation rate. With each cycle of the compressor 130, each nozzle member 94 produces an air jet.

In other constructions (not shown), the non-intrusive excavation assembly 12 may use another type of fluid, such as water. Also, in other constructions (not shown), for example, with a compressor with a lower capacity, the fluid jet assembly 90 may include a valve member (not shown) and a control member (not shown). In such a construction, with each cycle of the compressor, the source of fluid would only be supplied to selected nozzle members 94, increasing the force per air jet per compressor cycle. The control member and valve member would direct the fluid to the selected nozzle members 94.

The non-intrusive excavation assembly 12 also includes (see FIG. 1) a source of vacuum pressure connected to the vacuum assembly 114. In the illustrated construction, the source of vacuum pressure is a positive displacement blower 134 connected to the vacuum member 118. The blower 134 provides vacuum pressure at the vacuum opening 122 and adjacent the surface S to remove soil 92 from the surface S and to transport the soil 92 from the excavation site (as shown in FIG. 3).

The blower 134 includes (see FIG. 1) a filter assembly 136 to keep contaminants, such as dust and debris, from damaging the components of the blower 134. The blower 134 also includes intake and exhaust silencers 138 and 140 to reduce the noise created by the blower 134.

In the illustrated construction, the blower 134 has a capacity in the range of 5000 CFM and can exert a pressure of up to 28 Hg. The capacity of the blower 134 is based upon the excavation requirements, such as, for example, the type of soil 92 or other material to be excavated and the desired excavation rate.

In the illustrated construction, the compressor 130 has sufficient capacity to also provide power to various fluid-powered tools T in use at the excavation site. Such tools include hard-tooth excavation components, such as a pneumatic jack hammer. The compressor 130 is selectively connectable to the fluid-powered tool T and to the nozzle members 94 to power both components simultaneously.

In one construction, the fluid-powered tool T is (see FIGS. 1 and 7) a non-intrusive excavation wand member W. The wand member W may be operated to provide additional and more precise non-intrusive excavation in areas of complex utility junctions and clusters. Also, the wand member W may be operated during hard-tooth excavation with the bucket 38, during non-intrusive excavation with the excavation head 54, or separately to provide non-intrusive excavation.

The wand member W includes a wand housing 142 having an operator's handle 144. The wand housing 142 supports a wand nozzle 146 and a wand vacuum 148. The wand nozzle 146 is connected to the compressor 130 by a reduced diameter conduit 150 and a quick-disconnect member 152 connected to the supply conduit 110. An operator control lever 154 is connected to a valve (not shown) so that fluid is selectively supplied through the wand nozzle 144 to cut soil 92 from the surface S.

In this construction, the blower 134 has sufficient capacity to also provide vacuum pressure to the wand vacuum 148. The wand vacuum 148 is connected to the blower 134 by a conduit 156 connected to the vacuum member 118. The wand vacuum 148 removes soil 92 from the surface S and to transport the soil 92 from the excavation site.

In the illustrated constriction, the non-intrusive excavation assembly 12 also includes (see FIG. 1) a separator assembly 158 for separating soil 92 entrained in the air flowing through the vacuum assembly 114 toward the blower 134. The separator assembly 158 includes a cyclonic separator 160 and a baghouse filter assembly 162. The separator assembly 158 prevents soil 92 from entering the blower 134 and possibly clogging or damaging the blower 134.

In the illustrated construction, the non-intrusive excavation assembly 12 also includes a collection member 164 for collecting soil 92 disentrained by the separator assembly 158. The collection member 164 includes a dump valve 166 which is operable between an open position, in which soil 92 can be emptied from the collection member 164, and a closed position. To ensure emptying of the soil 92 from the collection member 164, a vibrator (not shown) vibrates a portion of the collection member 164.

The non-intrusive excavation assembly 12 also includes a power plant 168 for driving the compressor 130, the blower 134, the separator assembly 158 and the collection member 164. In other constructions (not shown), the compressor 130, the blower 134, the separator assembly 158 and the collection member 164 may be driven by the engine 26 of the vehicle 14.

The non-intrusive excavation assembly 12 also includes a support member 170 for supporting the compressor 130, the blower 134, the separator assembly 158, the collection member 164 and the power plant 168. The support member 170 includes mounting portions 172 that are removably connectable with the support arms 50 by fasteners 174. The compressor 130, blower 134, separator assembly 158, the collection member 164 and the power plant 168 are supported on the support member 170 so that the apparatus 10 is mobile and can be moved to and from excavation site and around the excavation site as a unit. Because of the respective capacities of the compressor 130, the blower 134 and the power plant 168, the excavation head 54 can be operated at distances up to five hundred feet from these power components.

Further, during excavation operations, the support member 170 and supported components can be disconnected from the apparatus 10 and positioned on the ground at the excavation site. This allows the apparatus 10 to be more easily maneuvered about the excavation site.

Also, the collection member 164 is supported by the support member 170 so that, when the support member 170 is connected to the support arms 50, the collection member 164 is movable between a collecting position (shown in FIG. 1), in which soil 92 is collected in the collection member 164, and an emptying position, in which soil 92 is emptied from the collection member 164. The collection member 164 is preferably lifted to position the dump valve 166 over the collecting portion of an appropriate material removal vehicle (not shown). The separate removal vehicle may be any suitable vehicle, such as a dump truck, a trailer or a wheel barrow. However, soil 92 may also simply be emptied onto the ground from the collection member 164. In either case, soil 92 is deposited from the collection member 164 away from the excavation site.

FIG. 8 illustrates an alternative embodiment of an apparatus 10' including an excavation assembly 12' embodying the invention. Common elements are identified by the same reference numbers "'".

The apparatus 10' includes a vehicle 14' having a frame 18' supported by tracks 202 or wheels 22' for movement over ground. In the illustrated construction, the vehicle 14' includes a hydrostatic transmission (not shown) to drive the tracks 202 or wheels 22'.

The apparatus 10' is primarily for use with the non-intrusive excavation assembly 12' described above. However, the apparatus 10' may also be used with a bucket 38' to provide hard-tooth excavation as well as non-intrusive excavation. Also, the fluid-powered tool T and the wand member W may be used with the apparatus 10'.

In the illustrated construction, the compressor 130', the blower 134', the separator assembly 158', the collection member 164' and the power plant 168' are supported on a support member 170', such as a skid, which is removably supported on the frame 18'. During excavation operations, the support member 170' and the supported components may removed from the frame 18', and the apparatus 10' can be moved around the excavation site more easily.

FIGS. 9–10 illustrate an alternative construction for a portion of an apparatus 10" for use with the non-intrusive excavation assembly 12. Common elements are identified by the same reference numbers '"'.

In this construction, the support member 170" is a chassis 204 for supporting the compressor 130", the blower 134", the separator assembly 158", the collection member 164" and the power plant 168" as a single unit. In the illustrated construction, the chassis 204 is a trailer assembly including wheels 206 or other movement means, such as tracks (not shown), and a trailer hitch 208. The chassis 204 is connected to a prime mover vehicle, such as vehicle 14 or vehicle 14', and moved to and from the excavation site and around the excavation site, as desired. Stabilizer arms 210 are extendable to stabilize the chassis 204 during excavation operations. During excavation operations, the chassis 204 may be disconnected from the vehicle 14 or 14' so that the vehicle 14 or 14' can be moved around the excavation site more easily.

In this construction, the collection member 164" is supported by a pair (one shown) of extendable hydraulic arms 214. The hydraulic arms 214 are operable to move the collection member 164" between a collecting position (shown in FIG. 9), in which soil 92 is collected in the collection member 164", and an emptying position (shown in FIG. 10), in which soil 92 is emptied from the collection member 164". The collection member 164" is preferably lifted upwardly and rearwardly (to the left in FIGS. 9–10) to position the dump valve 166" over the collecting portion of an appropriate material removal vehicle R. Preferably, the collecting member 164" can be lifted so that the dump valve 166" is at a desired height of up to approximately nine feet. The separate removal vehicle R may be any suitable vehicle, such as a dump truck, a trailer or a wheel barrow.

It should be understood that any of the embodiments of the apparatus 10, 10' or 10" may be used in the operation discussed below. For purposes of brevity, unless otherwise discussed, only the first embodiment of the apparatus 10 will be discussed in connection with the operation.

In operation, the apparatus 10 is positioned as required for the excavation operations. If required, the operator provides hard-tooth excavation with the rear bucket 38 and/or the front bucket 46 until entering an area in which utilities are located. At that time, the rear bucket 38 and the front bucket 46 are removed from the vehicle 14.

During the necessary hard-tooth excavation, another operator may operate a fluid-powered tool T to assist in the excavation operation. This other operator may be the "top man" observing the excavation, and the top man may use the wand member W to assist in the excavation operation to ensure that utilities are not damaged.

The non-intrusive excavation assembly 12 is then connected to the vehicle 14. The excavation head 54 is connected to the arm 42. The operator continues excavating in a non-intrusive manner with the excavation head 54. The support member 170 and the supported components may be supported on the ground or by the support arms 50.

The excavation head 54 is supported on the arm 42 so that the operator can control the position of the support surface 70 relative to the surface S. The operator can actuate the arm 42 to control the position and movement of the excavation head 54 in the same manner that the operator would control the operation of the rear bucket 38.

During operation of the excavation head 54, the top man can again observe the operation of the excavation head 54 and operate the wand member W to provide additional and more precise non-intrusive excavation.

With the apparatus 10, an operator can thus perform both hard-tooth excavation and non-intrusive excavation eliminating the necessity of having two different apparatus for these operations and reducing the associated costs.

The soil 92 is disentrained in the separator assembly 158 and collected in the collection member 164. The soil 92 can be emptied onto the ground adjacent the collection member 164. Alternatively, the collection member 164 can be lifted with the support member 170 by the support arms 50 to empty the soil into a soil removal vehicle.

In the construction illustrated in FIGS. 9–10, soil 92 is collected in the collection member 164". To empty the collection member 164", the removal vehicle R is positioned adjacent the rear of the chassis 204, and the arms 210 are operated to lift the collection member 164" to the emptying position (shown in FIG. 10). The dump valve 166" is opened and the vibrator is operated so that the soil 92 is emptied from the collection member 164". Once the collection member 164" is emptied, the collection member 164" is returned to the collecting position (shown in FIG. 9).

When desired, the removal vehicle R is moved to the desired soil collection site, which may be away from the excavation site. While the removal vehicle R is transporting the soil 92, excavation operations can continue with the apparatus 10.

In another embodiment of the invention (not shown), an apparatus is constructed so that the non-intrusive excavation assembly 12 is an integral part of the vehicle 14 and is not normally removable from the vehicle 14. The apparatus thus provides only non-intrusive excavation in the manner described above with respect to the apparatus 10 including the non-intrusive excavation assembly 12. Also, in other constructions (not shown), the chassis 204 is an integral part of the vehicle 14 so that, in such a construction, the non-intrusive excavation apparatus is a single unit.

The apparatus 10, 10' and 10" and the apparatus with the integral non-intrusive excavation assembly 12 provide a reduced likelihood of damaging utilities and the associated dangers and costs.

It should be understood that the non-intrusive excavation assembly 12 can be used to excavate many different types of solid material. For example, the non-intrusive excavation assembly 12 can excavate soil 92, concrete, asphalt, rock, or other types of solid material that are typically excavated by conventional hard-tooth excavation apparatus or non-intrusive excavation apparatus.

Various features of the invention are set forth in the following claims.

I claim:

1. An assembly for excavating a surface, said assembly comprising:
   a fluid-powered equipment component;
   a non-intrusive excavation head including a nozzle, said non-intrusive excavation head being separate from said fluid-powered equipment component; and
   a source of pressurized fluid selectively connectable to said fluid-powered equipment component and to said nozzle, said source of pressurized fluid, when connected to said fluid-powered equipment component, powering said fluid-powered equipment component, and said source of pressurized fluid, when connected to said nozzle, supplying fluid through said nozzle to cut the surface to be excavated.

2. The assembly as set forth in claim 1 wherein said source of pressurized fluid is connectable to said fluid-powered equipment component and to said nozzle to power said fluid-powered equipment component and to supply fluid through said nozzle to cut the surface to be excavated, simultaneously.

3. The assembly as set forth in claim 1 and further comprising a source of vacuum pressure, wherein said non-intrusive excavation head further includes a vacuum connected to said source of vacuum pressure to remove material cut from the excavated surface through said vacuum, and wherein said fluid-powered equipment is a wand member including
   a wand housing,
   a wand nozzle supported by said wand housing and connectable to said source of pressurized fluid so that fluid is supplied through said wand nozzle to cut the surface to be excavated, and
   a wand vacuum supported by said wand housing and connectable to said source of vacuum pressure so that material cut from the excavated surface is removed by said wand vacuum.

4. The assembly as set forth in claim 3 wherein said source of pressurized fluid is connectable to said nozzle and to said wand nozzle to supply fluid through said nozzle and through said wand nozzle to cut the surface to be excavated, simultaneously, and wherein said source of vacuum pressure is connectable to said vacuum and to said wand vacuum so that material cut from the excavated surface is removed by said vacuum and by said wand vacuum, simultaneously.

5. A method of operating an excavation apparatus, the excavation apparatus including a frame, an arm having one end supported on the frame and an other end movable relative to the frame, a hard-tooth excavation component having a cutting edge for cutting a surface to be excavated, and a non-intrusive excavation component including an excavation head having a nozzle and a vacuum, a source of pressurized fluid connected to the nozzle so that fluid is supplied through the nozzle to cut the surface to be excavated, and a source of vacuum pressure connected to the vacuum to remove material cut from the excavated surface, said method comprising the acts of:
   connecting the hard-tooth excavation component to the other end of the arm;
   moving the hard-tooth excavation component to cut the surface to be excavated;
   removing the hard-tooth excavation component from the arm;
   connecting the excavation head to the other end of the arm; and
   operating the excavation head to cut the surface to be excavated and to remove material cut from the excavated surface.

6. The method as set forth in claim 5 wherein the excavation apparatus further includes a fluid-powered equipment component separate from the excavation head, and wherein said method further comprises:
   connecting the fluid-powered equipment component to said source of pressurized fluid; and
   operating the fluid-powered equipment component.

7. The method as set forth in claim 6 wherein the fluid-powered equipment component is a wand member including a wand housing, a wand nozzle supported by the wand housing, and a wand vacuum supported by the wand housing, and wherein said method further comprises:
   connecting the wand nozzle to the source of pressurized fluid;
   supplying fluid through the wand nozzle to cut the surface to be excavated;
   connecting the wand vacuum to the source of vacuum pressure; and
   removing material cut from the excavated surface with the wand vacuum.

8. The method as set forth in claim 7 and further comprising selectively operating the wand member when the excavation apparatus is providing hard-tooth excavation and when the excavation apparatus is providing non-intrusive excavation.

9. The method as set forth in claim 5 wherein the other end of the arm includes a connecting portion, wherein said act of connecting the hard-tooth excavation component to the other end of the arm includes connecting the hard-tooth excavation component to the connecting portion, and wherein said act of connecting the excavation head to the other end of the arm includes connecting the excavation head to the connecting portion.

10. A method of operating an excavation assembly, the excavation assembly including a fluid-powered equipment component, a non-intrusive excavation head including a nozzle, the non-intrusive excavation head being separate from the fluid-powered equipment component; and a source of pressurized fluid, said method comprising the acts of:
   connecting the source of pressurized fluid to the fluid-powered equipment component;
   selectively powering the fluid-powered equipment component with the source of pressurized fluid;
   connecting the source of pressurized fluid to the nozzle; and
   selectively supplying fluid through the nozzle to cut the surface to be excavated.

11. The method as set forth in claim 10 and further comprising simultaneously powering the fluid-powered equipment component and supplying fluid through the nozzle to cut the surface to be excavated.

12. The method as set forth in claim 10 wherein the excavation assembly further includes a source of vacuum pressure, wherein the non-intrusive excavation head further includes a vacuum, wherein the fluid-powered equipment component is a wand member including a wand housing, a wand nozzle supported by the wand housing, and a wand vacuum supported by the wand housing, and wherein said method further comprises:

connecting the vacuum to the source of vacuum pressure;

selectively removing material cut from the excavated surface with the vacuum;

connecting the wand nozzle to the source of pressurized fluid;

selectively supplying fluid through the wand nozzle to cut the surface to be excavated;

connecting the wand vacuum to the source of vacuum pressure; and selectively removing material cut from the excavated surface with the wand vacuum.

13. The method as set forth in claim 12 and further comprising:

simultaneously supplying fluid through the nozzle and through the wand nozzle to cut the surface to be excavated; and simultaneously removing material cut from the excavated surface with the vacuum and with the wand vacuum.

14. An excavation apparatus comprising:

a frame;

an arm having one end supported on said frame and an other end movable relative to said frame;

a hard-tooth excavation component having a cutting edge for cutting a surface to be excavated, said hard-tooth excavation component being connectable to said other end of said arm so that, when said hard-tooth excavation component is connected to said arm, said hard-tooth excavation component is movable to cut the surface to be excavated; and a non-intrusive excavation component including an excavation head connectable to said other end of said arm and including a nozzle and a vacuum, a source of pressurized fluid connected to said nozzle so that fluid is supplied through said nozzle to cut the surface to be excavated, and a source of vacuum pressure connected to said vacuum to remove material cut from the excavated surface;

said hard-tooth excavation component and said excavation head being substitutable so that said excavation apparatus is operable to selectively provide hard-tooth excavation and non-intrusive excavation;

wherein said apparatus further comprises a support member supportingly connectable to said frame, said support member supporting said source of pressurized fluid and said source of vacuum pressure.

15. The excavation apparatus as set forth in claim 14 wherein said source of vacuum pressure creates a flow of fluid in which the material is entrained, and wherein said non-intrusive excavation component further includes a separator supported on said support member and for disentraining the material from said flow of fluid, and a collection member supported on said support member and movable relative to said frame from a collecting position, in which the disentrained material is collected in said collection member, to an emptying position, in which the disentrained material is emptiable from said collection member into a separate material removal vehicle, said collection member being liftable from the collection position to the emptying position.

16. An excavation apparatus comprising:

a frame;

an arm having one end supported on said frame and an other end movable relative to said frame;

a hard-tooth excavation component having a cutting edge for cutting a surface to be excavated, said hard-tooth excavation component being connectable to said other end of said arm so that, when said hard-tooth excavation component is connected to said arm, said hard-tooth excavation component is movable to cut the surface to be excavated; and a non-intrusive excavation component including an excavation head connectable to said other end of said arm and including a nozzle and a vacuum, a source of pressurized fluid connected to said nozzle so that fluid is supplied through said nozzle to cut the surface to be excavated, and a source of vacuum pressure connected to said vacuum to remove material cut from the excavated surface;

said hard-tooth excavation component and said excavation head being substitutable so that said excavation apparatus is operable to selectively provide hard-tooth excavation and non-intrusive excavation;

wherein said apparatus further comprises a fluid-powered equipment component connectable to said source of pressurized fluid so that said source of pressurized fluid, when connected to said fluid-powered equipment component, powers said fluid-powered equipment component, and wherein said fluid-powered equipment component is separate from said excavation head.

17. The excavation apparatus as set forth in claim 16 wherein said fluid-powered equipment component is a wand member including a wand housing, a wand nozzle supported by said wand housing and connectable to said source of pressurized fluid so that fluid is supplied through said wand nozzle to cut the surface to be excavated, and a wand vacuum supported by said wand housing and connectable to said source of vacuum pressure so that material cut from the excavated surface is removed by said wand vacuum.

18. The excavation apparatus as set forth in claim 17 wherein said wand member is selectively operable when said excavation apparatus is providing hard-tooth excavation and when said excavation apparatus is providing non-intrusive excavation.

19. An excavation apparatus comprising:

a frame;

an arm having one end supported on said frame and an other end movable relative to said frame;

a hard-tooth excavation component having a cutting edge for cutting a surface to be excavated, said hard-tooth excavation component being connectable to said other end of said arm so that, when said hard-tooth excavation component is connected to said arm, said hard-tooth excavation component is movable to cut the surface to be excavated; and a non-intrusive excavation component including an excavation head connectable to said other end of said arm and including a nozzle and a vacuum, a source of pressurized fluid connected to said nozzle so that fluid is supplied through said nozzle to cut the surface to be excavated, and a source of vacuum pressure connected to said vacuum to remove material cut from the excavated surface;

said hard-tooth excavation component and said excavation head being substitutable so that said excavation apparatus is operable to selectively provide hard-tooth excavation and non-intrusive excavation;

wherein said excavation apparatus further comprises a support member connectable to said frame, said support member supporting said source of pressurized fluid and said source of vacuum pressure; and wherein said excavation apparatus further comprises a second arm having one end supported on said frame and an other end movable relative to said frame, wherein said support member is connectable to said other end of said second arm.

20. The excavation apparatus as set forth in claim 19 and further comprising a second hard-tooth excavation component having a cutting edge for cutting a surface to be excavated, said second hard-tooth excavation component being connectable to said other end of said second arm so that, when said second hard-tooth excavation component is connected to said second arm, said second hard-tooth excavation component is movable to cut the surface to be excavated, said second hard-tooth excavation component and said support member being substitutable.

21. An excavation apparatus comprising:

a frame;

an arm having one end supported on said frame and an other end movable relative to said frame;

a hard-tooth excavation component having a cutting edge for cutting a surface to be excavated, said hard-tooth excavation component being connectable to said other end of said arm so that, when said hard-tooth excavation component is connected to said arm, said hard-tooth excavation component is movable to cut the surface to be excavated; and a non-intrusive excavation component including
an excavation head connectable to said other end of said arm and including a nozzle and a vacuum,
a source of pressurized fluid connected to said nozzle so that fluid is supplied through said nozzle to cut the surface to be excavated, and
a source of vacuum pressure connected to said vacuum to remove material cut from the excavated surface;

said hard-tooth excavation component and said excavation head being substitutable so that said excavation apparatus is operable to selectively provide hard-tooth excavation and non-intrusive excavation;

wherein said other end of said arm includes a connecting portion, and wherein said hard-tooth excavation component and said excavation head are selectively and alternatively connectable to said connecting portion of said other end of said arm.

22. An excavation apparatus comprising:

a frame;

an arm having one end supported on said frame and an other end movable relative to said frame;

an excavation head connected to said other end of said arm so that said excavation head is movable relative to said frame, said excavation head including
a nozzle, and
a vacuum;

a source of pressurized fluid connected to said nozzle so that fluid is supplied through said nozzle to cut a surface to be excavated;

a source of vacuum pressure connected to said vacuum so that material cut from the excavated surface is removed by said vacuum, said source of vacuum pressure creating a flow of fluid in which the material is entrained;

a separator for disentraining the material from said flow of fluid;

a collection member for collecting the disentrained material, said collection member being movable from a collecting position, in which the disentrained material is collected in said collection member, to an emptying position, in which the disentrained material is emptyable from said collection member into a separate material removal vehicle, said collection member being liftable from the collection position to the emptying position; and a support member supporting said source of fluid pressure, said source of vacuum pressure, said separator and said collection member, said support member being supportable by said frame;

wherein, during excavation operations, said support member is removable from said frame and said frame is movable away from said support member to conduct excavation operations with said excavation head.

23. An excavation apparatus comprising:

a frame;

an arm having one end supported on said frame and an other end movable relative to said frame;

a hard-tooth excavation component having a cutting edge for cutting a surface to be excavated, said hard-tooth excavation component being connectable to said other end of said arm so that, when said hard-tooth excavation component is connected to said arm, said hard-tooth excavation component is movable to cut the surface to be excavated; and a non-intrusive excavation component including
an excavation head connectable to said other end of said arm and including a nozzle and a vacuum,
a source of pressurized fluid connected to said nozzle so that fluid is supplied through said nozzle to cut the surface to be excavated, and
a source of vacuum pressure connected to said vacuum to remove material cut from the excavated surface;

said hard-tooth excavation component and said excavation head being substitutable so that said excavation apparatus is operable to selectively provide hard-tooth excavation and non-intrusive excavation;

wherein said excavation apparatus further comprises a fluid-powered equipment component connectable to said source of pressurized fluid so that said source of pressurized fluid, when connected to said fluid-powered equipment component, powers said fluid-powered equipment component; and wherein said fluid-powered equipment component is a fluid-powered jack hammer.

24. An assembly for excavating a surface, said assembly comprising:

a fluid-powered equipment component;

a non-intrusive excavation head including a nozzle; and a source of pressurized fluid selectively connectable to said fluid-powered equipment component and to said nozzle, said source of pressurized fluid, when connected to said fluid-powered equipment component, powering said fluid-powered equipment component, said source of pressurized fluid, when connected to said nozzle, supplying fluid through said nozzle to cut the surface to be excavated;

wherein said fluid-powered equipment component is a fluid-powered jack hammer.

* * * * *